United States Patent

Costa et al.

[11] 4,197,007
[45] Apr. 8, 1980

[54] DEVICE FOR EVALUATING THE LIGHT-TRANSMITTING CHARACTERISTICS OF OPTICAL FIBERS

[75] Inventors: Bruno Costa, Turin; Bruno Sordo, Dogliani-Cuneo, both of Italy

[73] Assignee: CSELT - Centro Studi e Laboratori Telecomunicazioni, Turin, Italy

[21] Appl. No.: 902,795

[22] Filed: May 4, 1978

[30] Foreign Application Priority Data

May 5, 1977 [IT] Italy ............................... 68006 A/77
Jul. 15, 1977 [IT] Italy ............................... 68642 A/77

[51] Int. Cl.² ........................................... G01N 21/00
[52] U.S. Cl. ..................................... 356/73.1; 356/432
[58] Field of Search ...................... 356/237, 239, 73.1, 356/432; 350/96.15, 96.16, 96.18

[56] References Cited

U.S. PATENT DOCUMENTS

| | | | |
|---|---|---|---|
| 3,884,585 | 5/1975 | Lebduska | 356/239 |
| 4,012,149 | 3/1977 | Bouillie et al. | 356/237 |
| 4,021,099 | 5/1977 | Kawasaki et al. | 350/96.18 |
| 4,021,121 | 5/1977 | Schicketanz | 356/237 |

Primary Examiner—Vincent P. McGraw
Attorney, Agent, or Firm—Karl F. Ross

[57] ABSTRACT

To intercept and measure radiant energy back-scattered from the entrance end of an optical fiber irradiated by a pulsed laser beam, a semitransparent mirror is interposed between the irradiated fiber and a first lens assembly focusing the laser beam upon its entrance end while a second lens assembly directs reflected light rays toward a photodetector feeding an electronic processor. An extremity of the fiber including its entrance end is received in a chamber with light-absorbing walls filled with a liquid of substantially the same refractive index as the fiber; the mirror may be disposed either in front of the chamber entrance or in its interior.

8 Claims, 2 Drawing Figures

DEVICE FOR EVALUATING THE LIGHT-TRANSMITTING CHARACTERISTICS OF OPTICAL FIBERS

FIELD OF THE INVENTION

Our present invention relates to a device for evaluating the light-transmitting characteristics of optical fibers, more specifically for determining their attenuation coefficient and locating possible faults.

BACKGROUND OF THE INVENTION

A conventional method of measuring the attenuation characteristics of such a fiber involves cutting the fiber into several sections of different length, transmitting a light pulse of given intensity to each section and measuring the intensity of the luminous radiation received at the exit end of each section; from the difference of the measured values, the mean attenuation coefficient can be determined. This technique, of course, cannot be utilized with fibers already installed in a light-transmission system.

A more expeditious method has been described by M. K. Barnoski and S. M. Jensen in a paper entitled "Fiber Waveguides: A Novel Technique For Investigating Attenuation Characteristics", published in APPLIED OPTICS, Vol. 15, No. 9, Sept. 1976. According to that proposal, radiant energy back-scattered from an optical fiber irradiated with pulsed light is intercepted and measured. The intensity and the wave shape of the back-scattered radiation supply information not only about the overall attenuation but also about the location of possible faults along the fiber.

In order to prevent spurious reflections from reaching the evaluation system, thereby falsifying the results, the article proposes to apply the luminous test pulse to a tapered zone of the fiber rather than to an end face thereof and to collect the back-scattered rays at an end of that zone. Such a procedure requires a delicate pretreatment of the fiber, with partial removal of any external coating present thereon.

OBJECT OF THE INVENTION

The object of our present invention is to provide a device which solves the problem of suppressing spurious reflections, in the testing of an optical fiber by a method such as the one described in the aforementioned article, with avoidance of the need for any pretreatment of the fiber to be tested.

SUMMARY OF THE INVENTION

We realize this object, in accordance with our present invention, by providing an enclosure which forms a chamber with light-absorbing walls adapted to receive an extremity of a fiber to be tested, the chamber being filled with a liquid whose refractive index substantially matches that of the fiber so that no significant reflections or refractions occur at the interface between the liquid and the fiber. The chamber is closed toward the outside by transparent cover means overlying at least one aperture in a wall thereof through which an entrance face of the fiber can be illuminated by an outside source of luminous energy, preferably a pulsed laser. With the aid of first focusing means disposed between that source and the enclosure, the luminous energy is concentrated into an incident beam which passes through a window formed by the transparent cover means and impinges upon the aforementioned entrance face. Rays back-scattered from the fiber through that face are intercepted by light-reflecting means, such as a semitransparent mirror or beam splitter in the path of the incident beam, and are concentrated by suitably aligned second focusing means outside the enclosure into an outgoing beam directed to a processor which determines their energy content.

The back-scattered rays may leave the chamber by the same window through which the incident beam enters. In that event, the semitransparent mirror is disposed outside the enclosure and is thus surrounded by a medium (generally air) whose index of refractivity differs from that of the fiber and of the liquid filling the chamber. At the window, whose transparent cover also necessarily has a refractive index different from that of air, a certain reflection of incident rays will unavoidably occur. It is therefore necessary to orient that window with reference to the beam axis (defined by the first focusing means) in such a way that reflections from the outer or the inner cover surface will not reach the mirror.

Alternatively, we may position the mirror inside the chamber, in which case two separate windows will be required for the entering beam and the exiting back-scattered rays. With the incident beam convergingly trained upon the confronting fiber end, its rays will not be bent or measurably reflected by the outer cover surface of the entrance window if that surface is spherically convex and centered on the vertex of the cone defined by these rays. If the transparent cover material has a refractive index matching that of the liquid within the chamber, the interface between this liquid and the cover will also not give rise to any reflection or refraction. By the same token, spurious reflections at the cover of the exit window will be avoided if the latter, again with a matching refractive index, has a spherically convex outer surface centered upon the image of the vertex of the incident-ray cone as reflected by the semitransparent mirror, i.e. if the two outer surfaces have the same radius of curvature.

BRIEF DESCRIPTION OF THE DRAWING

The above and other features of our invention will now be described in detail with reference to the accompanying drawing in which.

SPECIFIC DESCRIPTION

Figure 1:
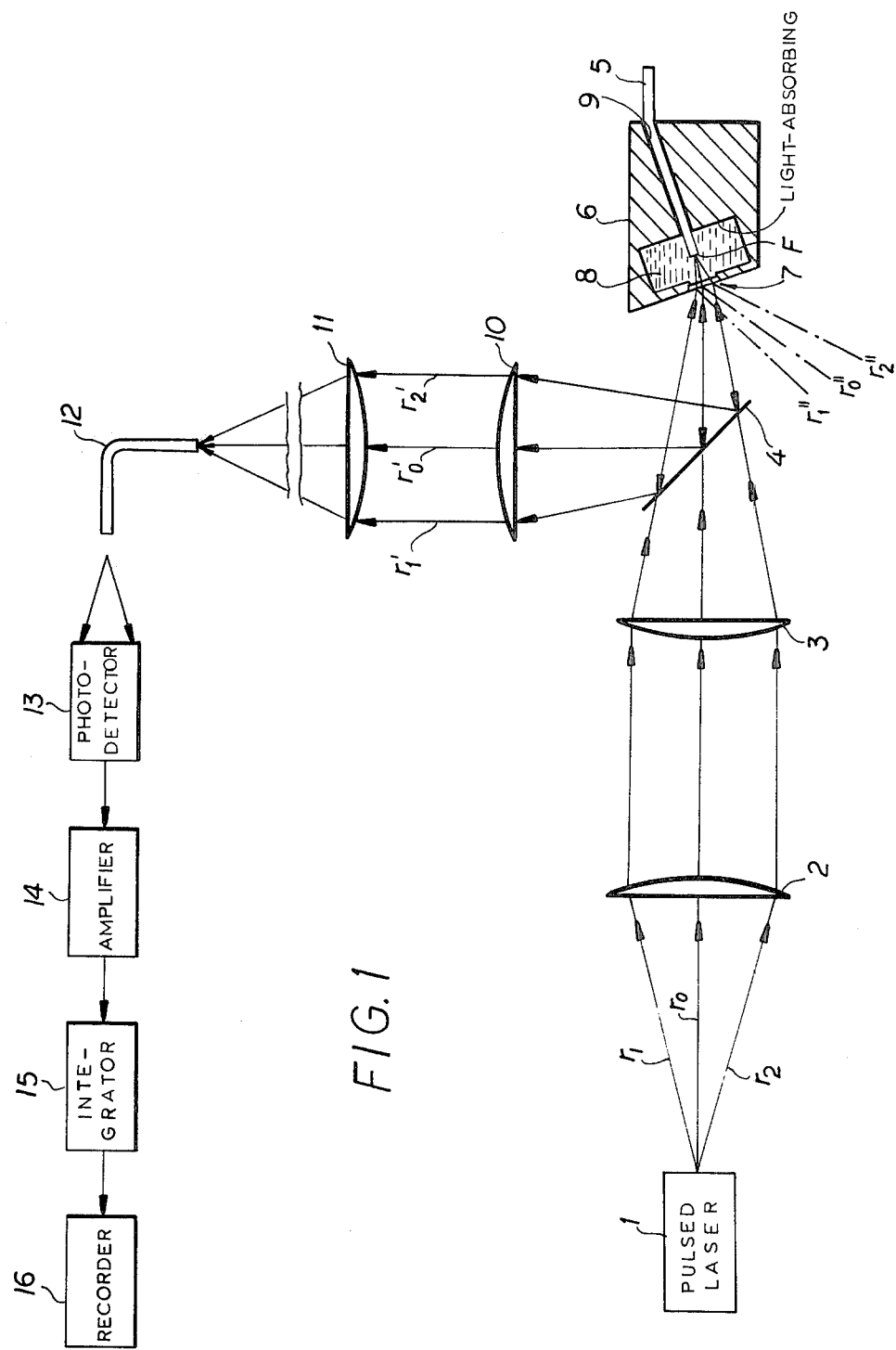
FIGS. 1 and 2 are somewhat diagrammatic views of two representative embodiments.

In FIG. 1 we have shown a source of luminous radiation 1, specifically a pulsed laser, aligned with an objective constituted by a pair of positive lenses 2 and 3 which form the emitted light pulses into an incident beam represented by an axial ray $r_0$ and two boundary rays $r_1$, $r_2$. A semitransparent mirror 4 intersects the beam axis, defined by ray $r_0$, at an angle of 45° downstream of the objective 2, 3, i.e. in a region where these rays converge conically toward an enclosure 6 holding an optical fiber 5 to be tested. Enclosure 6 forms a chamber 8 into which the fiber 5 projects by way of a narrow bore 9 which is located in a wall opposite a window formed by a transparent cover 7. Chamber 8 is filled with a liquid whose refractive index is substantially identical with that of the fiber material; its walls are lined with a light-absorbing substance, e.g. black velvet.

The front wall of chamber 8, containing the window 7, is inclined with reference to the beam axis so that reflections of incident rays at the cover 7, indicated by rays $r_0''$, $r_1''$ and $r_2''$, will bypass the mirror 4 and not reach any other part of the system. The incident rays $r_0$, $r_1$, $r_2$ are refracted at the outer surface of cover 7, as well as on its inner surface if its refractive index differs from that of the liquid in the chamber, so that ray $r_0$ passes into the chamber 8 at an angle to the beam axis; this is also the angle of inclination of the bore 9 and therefore of the extremity of fiber 5 received therein. Thus, the incident beam is effectively focused upon a point F at the center of the confronting fiber face, that point lying within chamber 8 at a substantial distance from cover 7.

Rays back-scattered from the interior of fiber 5 within the aperture angle of the incident beam, returning along the path of rays $r_0$, $r_1$, $r_2$ to mirror 4, are reflected by the latter in the form of outgoing rays $r_0'$, $r_1'$, $r_2'$ which are focused by two further lenses 10, 11 into an outgoing beam trained upon a confronting end of a light-guiding fiber segment 12 of substantially the same material and optical characteristics as the fiber 5 to be tested. The fiber segment 12 helps exclude extraneous radiation in directing the collected rays toward an electronic processor including a photodetector 13, an amplifier 14, an integrator 15 and a recorder 16. The information stored in this recorder can thus be used in the known manner for evaluating the transmission characteristics of the fiber.

Figure 2:
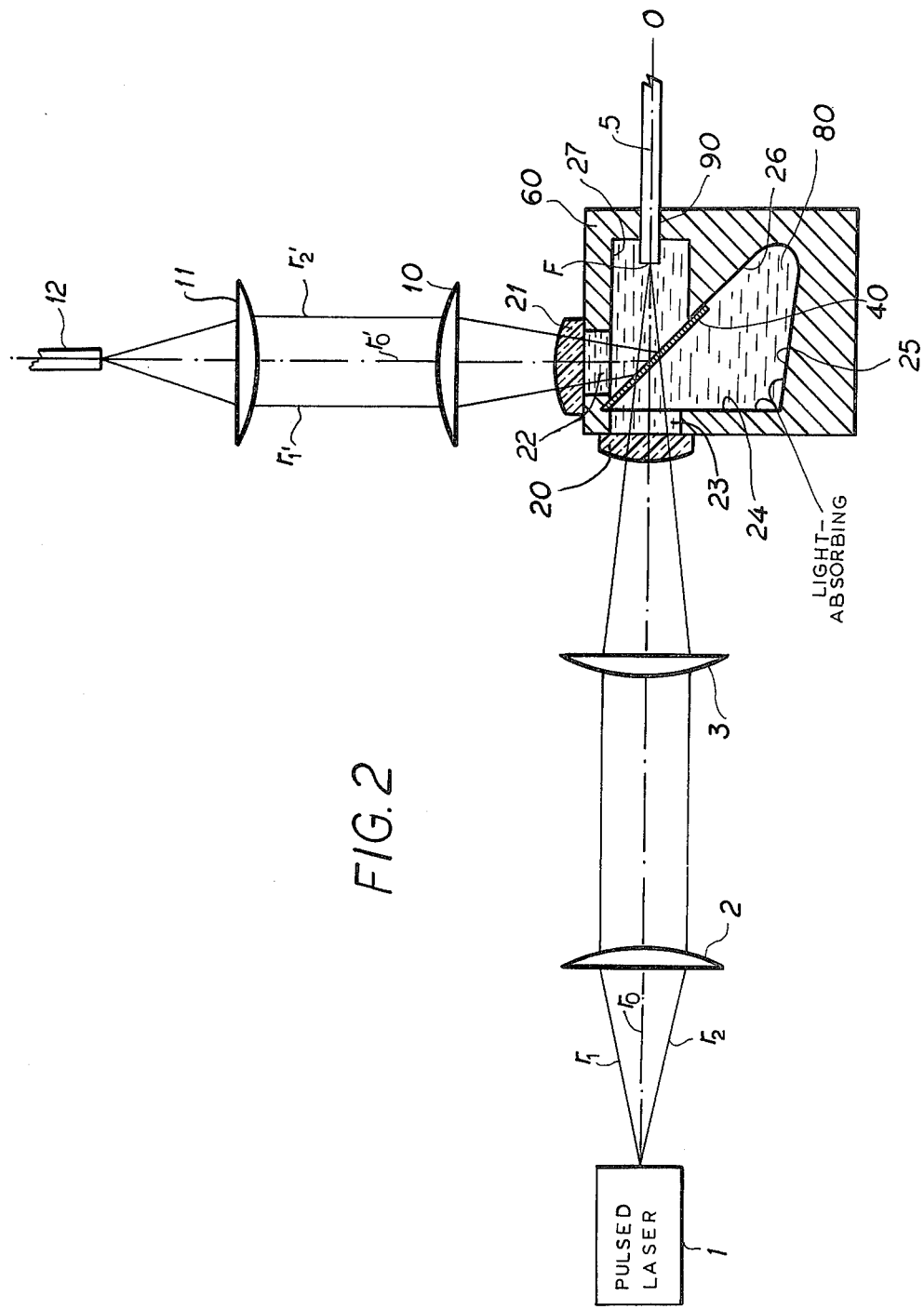

In FIG. 2 we have shown the same elements 1-3 and 10-12 as in FIG. 1 serving to form an incident and an outgoing beam. A semitransparent mirror 40 in the path of the incident beam is here disposed in a chamber 80 of an enclosure 60 having walls 24, 25, 26 lined with a light-absorbing material, the chamber being filled with a liquid whose refractive index substantially corresponds to that of the fiber 5 to be tested. In this instance, however, a fiber-receiving bore 90 of enclosure 60 is aligned with the optical axis O of the incident beam which is focused upon the center F of the confronting fiber face. An entrance aperture 23 in sidewall 24 and an exit aperture 22 in another sidewall 27, perpendicular to wall 24, are overlain by respective covers 20 and 21 of a transparent material whose refractive index substantially corresponds to that of the fiber 5 and of the liquid in chamber 80. The two covers are of planoconvex shape, yet the configuration of their inner surfaces does not matter since these surfaces are in direct contact with the liquid. The outer surface of cover 20, defining the entrance window, is centered on the vertex F of the cone of incident rays $r_0$, $r_1$, $r_2$; the outer surface of cover 21, defining the exit window, has the same radius as that of cover 20 and is centered on the image of point F as reflected by mirror 40. Thus, the incoming rays $r_0$, $r_1$, $r_2$ as well as the outgoing rays $r_0'$, $r_1'$, $r_2'$ travel along straight lines into and out of the chamber 80. Point F is again spaced inward from cover 20 constituting the entrance window as well as from cover 21 constituting the exit window.

The bores 9 and 90 are of a capillary nature, preventing the escape of liquid from chamber 8 or 80 upon the withdrawal of the fiber 5. For testing, that fiber does not have to undergo any pretreatment and need not be separated from an optical cable of which it forms part.

Naturally, the beam-forming lenses 2, 3, 10, 11 may be adjustably supported to enable their precise orientation with reference to the fiber 5 as discussed above.

We claim:

1. A device for evaluating the light-transmitting characteristics of an optical fiber, comprising:
   an enclosure forming a chamber with light-absorbing walls adapted to receive an extremity of a fiber to be tested, said chamber being filled with a liquid having a refractive index substantially matching that of said fiber;
   transparent cover means overlying at least one aperture in a wall of said chamber for facilitating illumination of an entrance face of said fiber;
   a source of luminous energy outside said enclosure;
   first focusing means disposed between said source and said enclosure for concentrating said luminous energy into a converging incident beam passing through said cover means and impinging upon said entrance face at a location spaced inward from said cover means;
   a semitransparent mirror positioned in the path of said converging incident beam to intercept rays back-scattered from the fiber through said entrance face;
   second focusing means outside said enclosure aligned with said mirror for concentrating said back-scattered rays into an outgoing beam; and
   processing means in the path of said outgoing beam for determining the energy content of said back-scattered rays.

2. A device as defined in claim 1 wherein said mirror is disposed outside said enclosure, said cover means forming a single window for the entry of said incident beam and for the exit of said back-scattered rays.

3. A device as defined in claim 2 wherein said window is inclined to an optical axis, defined by said first focusing means, at an angle preventing the interception by said mirror of rays from said incident beam reflected back by said window, said chamber having a wall opposite said window provided with a fiber-receiving bore in line with the path of an incident axial ray refracted by said window.

4. A device as defined in claim 1 wherein said mirror is disposed in said chamber, said cover means forming a first window in line with said first focusing means for the entry of said incident beam and a second window in line with said second focusing means for the exit of said back-scattered rays.

5. A device as defined in claim 4 wherein said chamber has a wall opposite said first window provided with a fiber-receiving bore in line with an optical axis defined by said first focusing means, said first focusing means forming said incident beam into a cone converging toward a point on said axis positioned to coincide with the center of the entrance face of the fiber received in said bore, said first window having a convex outer surface centered on said point, said second window having a convex outer surface centered on the image of said point as reflected by said mirror, both said windows consisting of a material with a refractive index substantially matching that of said liquid.

6. A device as defined in claim 1, 2 or 4, further comprising a fiber segment, of a material substantially identical with that of the fiber to be tested, interposed between said second focusing means and said processing means for guiding the light rays of said outgoing beam.

7. A device as defined in claim 1 wherein said source comprises a pulsed laser.

8. A device as defined in claim 7 wherein said processing means comprises a photodetector, amplifying and integrating circuitry connected to said photodetector, and recording means connected to said circuitry.

* * * * *